United States Patent [19]

Leonard et al.

[11] Patent Number: 4,649,328
[45] Date of Patent: Mar. 10, 1987

[54] METHOD FOR AUTOMATIC SPEED LOOP TUNE-UP IN A MACHINE DRIVE

[75] Inventors: John A. Leonard, Earlysville, Va.; Harry A. Plumb, Erie, Pa.

[73] Assignee: General Electric Co., Charlottesville, Va.

[21] Appl. No.: 749,070

[22] Filed: Jun. 26, 1985

[51] Int. Cl.$^4$ .............................................. H02P 5/16
[52] U.S. Cl. .................................... 318/317; 318/341; 318/410; 318/327
[58] Field of Search ............... 318/270, 274, 276, 278, 318/315, 317, 326, 327, 341, 384, 385, 386, 387, 388, 393, 397, 398, 400, 404, 606, 607, 611, 616, 617, 618, 621, 410

[56] References Cited

U.S. PATENT DOCUMENTS

| | | | |
|---|---|---|---|
| 3,627,080 | 12/1971 | Yuminaka | 318/397 X |
| 3,634,745 | 1/1972 | Agin | 318/327 X |
| 3,836,833 | 9/1974 | Harris et al. | 318/618 X |
| 3,911,343 | 10/1975 | Oster | 318/395 X |
| 4,162,437 | 7/1979 | Keith et al. | 318/400 X |
| 4,300,079 | 11/1981 | Kawada et al. | 318/390 |
| 4,341,985 | 7/1982 | Houskamp | 318/260 |
| 4,342,379 | 8/1982 | Games et al. | 318/617 X |
| 4,473,786 | 9/1984 | Miyashita et al. | 318/618 X |
| 4,513,232 | 4/1985 | Safiuddin | 318/393 X |

Primary Examiner—William M. Shoop, Jr.
Assistant Examiner—Shik Luen Paul Ip
Attorney, Agent, or Firm—Irving M. Freedman

[57] ABSTRACT

Motor-load inertia of a drive system is determined from motor friction current and the time required to accelerate and decelerate to a predetermined speed in response to a current command. A desired response time provided by the operator is checked to determine if the response time is achievable with the motor-load inertia previously determined. The maximum achievable response time based on motor-load inertia is determined if the desired response time is not achievable. The speed loop parameters based on the achievable response time and motor-load inertia.

5 Claims, 4 Drawing Figures

1) Set the drive up to be in a non-regenerative, non-reversing, current regulating mode.
2) Make sure the motor is stopped.
3) Increase the motor current by 1% every 100m sec until the motor starts accelerating. Identify and store this current as $I_{stiction}$ ($I_{LS}$).
4) Decrease the current as described above to find $I_{friction}$ ($I_{Lf}$).
5) Stop the motor.
6) Issue a current command to the drive equal to $I_{LS}$ + 5% of rated current.
7) When the motor begins to accelerate, issue a current command to the drive equal to $I_{LF}$ + 5% of rated current.
8) From the issuance of the command identified in step 7, record the time required for the motor to reach 10% of top speed. This time will be designated as $t_u$.
9) When the motor reaches 10% of top speed, issue a command to the drive for a "coast to stop".
10) Record the time from the issuance of the command in step 9 until the motor is stopped. This time will be designated as $t_d$.
11) Calculate the inertia reflected on the motor's shaft as per Equation (1).
12) Verify that the desired response (speed loop crossover frequency $-w_c$) is feasible with the measured inertia based on Equation (11). If $wK^2_{max}$ is less than or equal to $wK^2_{measured}$, THEN, a new $w_c$ must be calculated using Equation (11).
13) Use $wK_{measured}$ and the desired $w_c$ to calculate the speed loop parameters.

FIG. 3

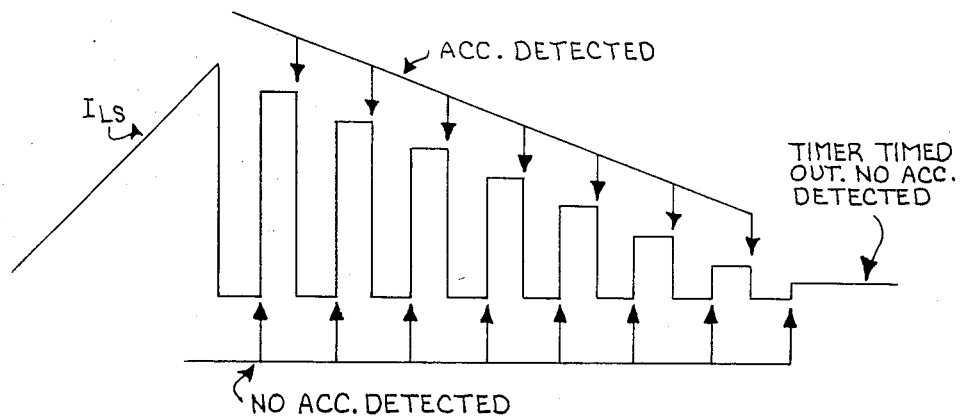

FIG. 4

METHOD FOR AUTOMATIC SPEED LOOP TUNE-UP IN A MACHINE DRIVE

BACKGROUND OF THE INVENTION

The present invention relates to electric motor drive systems and more particularly to a method of automatically tuning up the speed loop in a motor drive system coupled to a load.

General purpose drives can be connected to electric motors with widely varying parameters. The motors in turn can be driving loads of different inertia. In order to achieve optimum motor performance in terms of damping and response time it is necessary to match drive parameters to the actual motor characteristics.

If the total system inertia reflected to the motor shaft is known the control parameters can be adjusted to achieve the desired damping and speed of response desired. Accurate system inertia information is usually not available. When a drive is installed in a factory it is necessary to adjust control system parameters while operating the motor coupled to the load. The adjustment is time consuming and involves repetitive trial and error adjustments. The adjustments typically can take two hours with difficult cases taking much longer. The results are satisfactory but certainly not optimal as far as damping characteristics and speed of response.

If optimum performance could be achieved, cycle time in performing repetitive operations calling for fast response times could be significantly reduced. It is an object of the present invention to automatically adjust the control parameters of the speed loop of a drive system to achieve a commanded operator response time while the drive system is connected to the load.

It is a further object of the present invention to automatically adjust the control parameters of the speed loop of a drive system in less than a minute, responsive to a desired system time selected by an operator.

SUMMARY OF THE INVENTION

In one aspect of the present invention a method of automatically tuning up a motor drive system coupled to a load having a current control loop is provided. The method comprises the steps of providing a desired response for the motor drive system. The motor-load inertia is determined from the time required to accelerate the motor to a predetermined speed from a Commanded current. Next the desired response is checked to see if it is achievable with the inertia determined. If the desired response is not achievable the maximum response time based on the inertia is determined.

The speed loop parameters are set based on achievable response and measured inertia, thereby tuning up the speed loop.

BRIEF DESCRIPTION OF THE DRAWING

The features of the invention believed to be novel are set forth with particularly in the appended claims. The invention itself, both as to organization and method of operation, together with further objects and advantages thereof, may best be understood by reference to the following description taken in conjunction with the accompanying drawing in which:

FIG. 3 is flow chart representation of the automatic speed loop tune up steps implemented by the microprocessor in the speed loop tune up apparatus; and FIG. 4 is a graph showing motor current versus time while motor friction current is being determined.

DETAILED DESCRIPTION OF THE INVENTION

Figure 1:
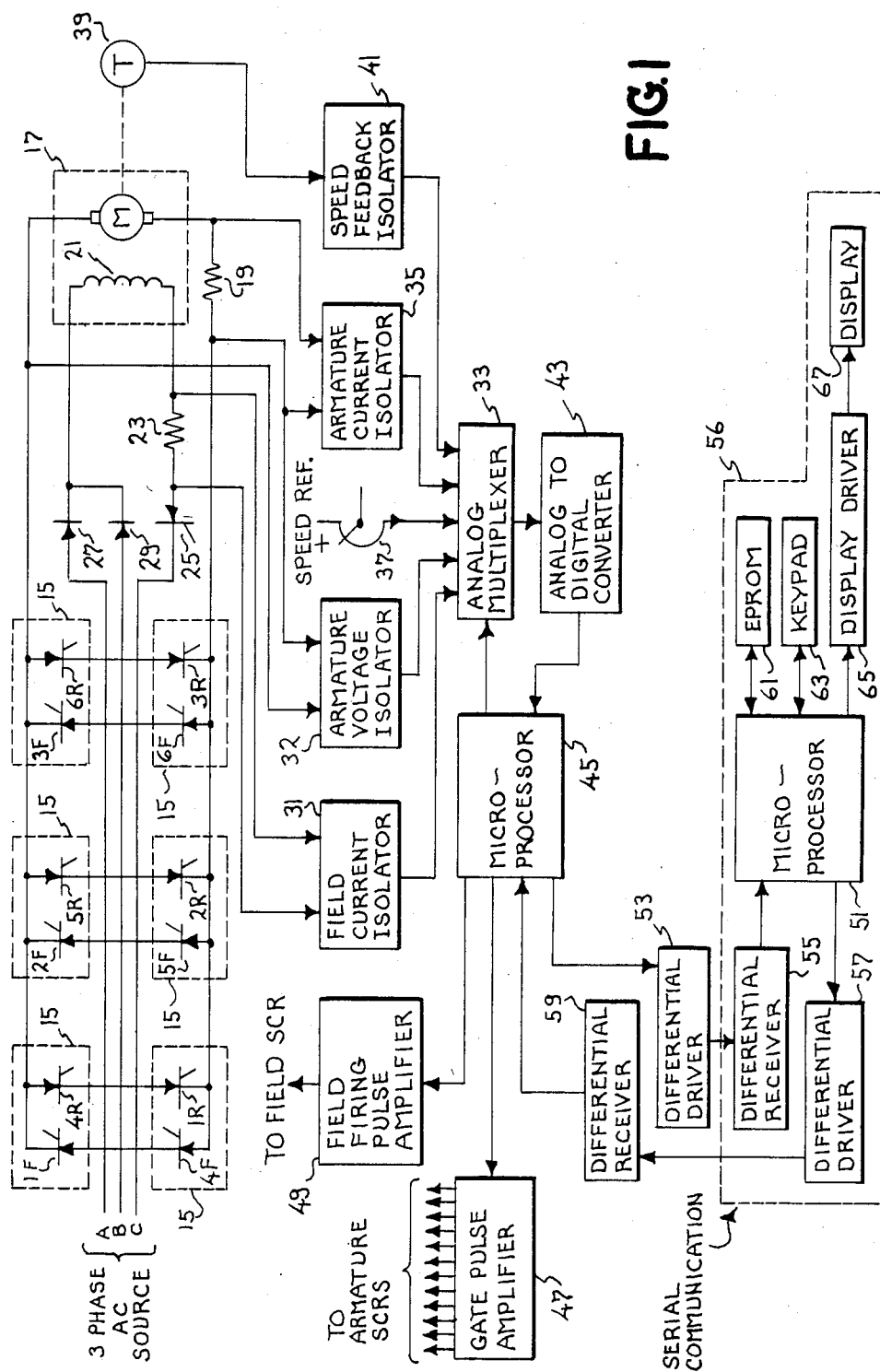
FIG. 1 is a block diagram representation of a motor drive system and an automatic speed loop tune up apparatus in accordance with the present invention.

Referring now to the drawing and particularly FIG. 1 thereof, there is shown a DC motor drive system and automatic speed loop tune-up apparatus. A dual three phase full wave silicon controlled rectifier (SCR) bridge 13 includes twelve SCRs comprising six SCR packages 15 containing two SCRs each. SCRs designated 1F through 6F coupled together to form a first full bridge rectifier. SCRs designated 1R through 6R are coupled together to form a second full bridge rectifier. The dual rectifier bridge is coupled to a three phase AC power source which line commutates the SCRs. THe DC output of the dual rectifier is coupled to the armature of a DC motor 17, through a shunt 19. One side of a field winding of the DC motor 17 is coupled through a shunt 23 to the anode of an SCR25. The cathode of SCR 25 is coupled to one phase of the three phase source. The other two phases of the three phase AC source are coupled to the anodes of diodes 27 and 29, respectively. The cathodes of diodes 27 and 29 are both connected to the other side of the field winding 23.

When forward motor torque is desired, SCRs in the first bridge are fired using the firing order (1F, 6F, 2F, 4F, 3F and 5F, with successive pairs of SCRs conductive at the same time (e.g. 5F and 1F, 1F and 6F) and SCR25 is fired to provide field current. When reverse motor rotation is desired, the SCRs in the second bridge are fired using the firing order 1R, 6R, 2R, 4R, 3R and 5R, resulting in an opposite polarity DC voltage on the motor armature compared to the voltage when the SCRs in the forward bridge are fired.

A field current isolator circuit 31 is coupled across shunt resistor 23 and provides a filtered analog field current signal to an analog multiplexer 33. An armature voltage isolation circuit 32 is coupled across the output of the dual rectifier bridge 13 and provides a filtered analog armature voltage signal to analog multiplexer 33. An armature current isolator circuit 35 is coupled across shunt resistor 19 and provides a filtered analog armature current signal to analog multiplexer 33. A speed reference 37 provides an analog reference signal to multiplexer 33. A tachogenerator 39 driven by DC motor 17, provides a signal to a speed feedback isolator 41, which in turn provides a filtered signal to the analog multiplexer. The output of the analog multiplexer is coupled to an analog to digital converter 43 which provides a digital signal to a microprocessor 45. Microprocessor 45, which can comprise a plurality of microprocessors such as Intel's 8031, controls the switching of analog multiplexer 33. The microprocessor 45 provides gate pulse signals to a gate pulse amplifier 47. Gate pulse amplifier 47 provides and output signal to each of the gates of the twelve SCRs in the dual bridges. Gate pulse signals are also provided to field firing pulse amplifier 49. Field firing pulse amplifier is connected to the gate of SCR25 which controls the field current.

Microprocessor 45 is connected by a serial communication link with a microprocessor 51 by a differential driver 53 and differentiated receiver 55. Microprocessor 51 is part of an automatic tune-up apparatus 56 which is connected by a serial link comprising differential driver 57 and differential receiver 59 to microprocessor 45. Microprocessor 51, which can comprise an Intel 8031 microprocessor, for example is coupled to a read only memory 61 containing programs for the speed loop drive tune-up. Dperator input of desired response time is accomplished by a keypad 63 connected to microprocessor 51. A display driver 65 drives a ten digit display.

Figure 2:
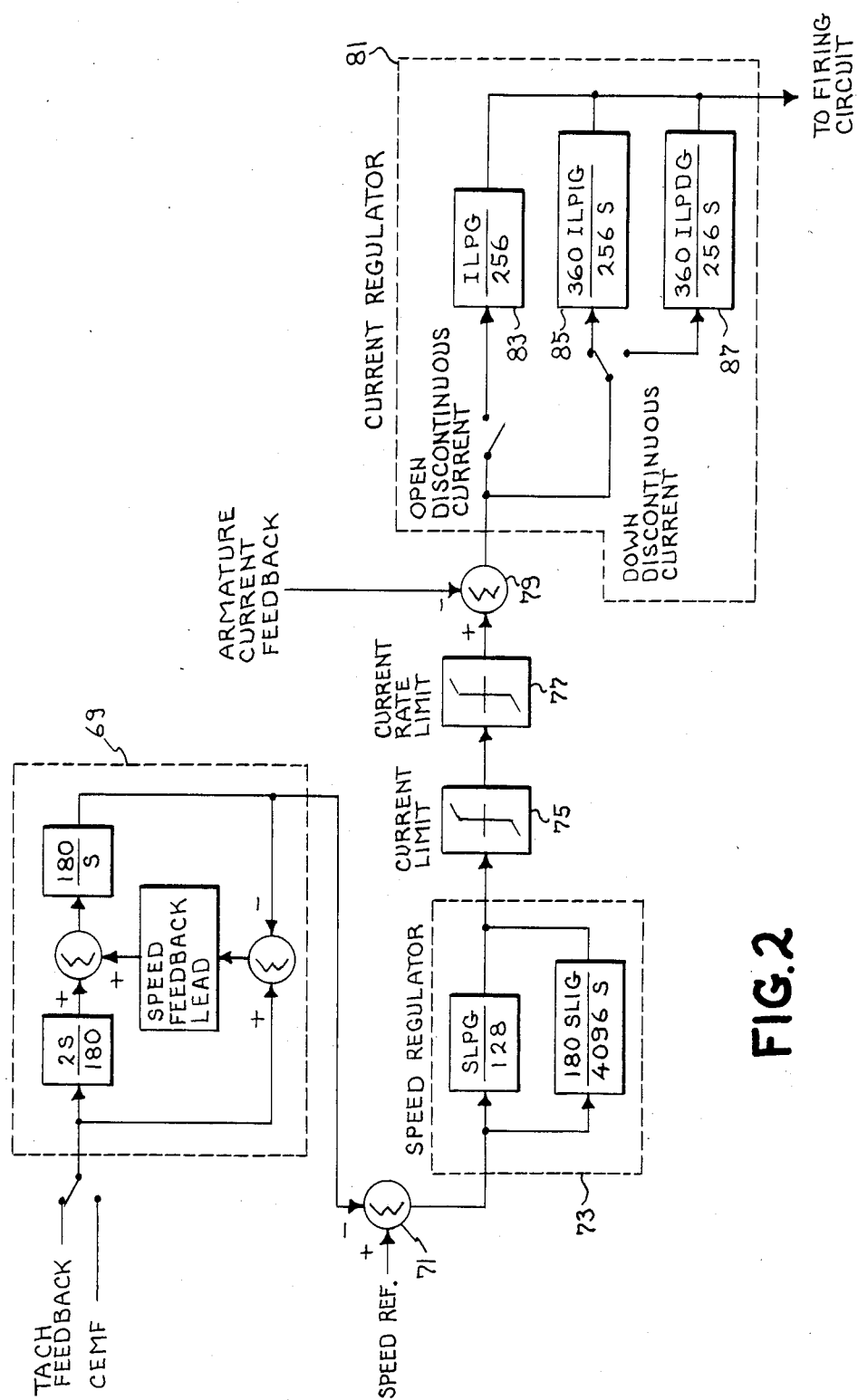
FIG. 2 is a block diagram representation of the speed loop and current loop implemented by the drive system microprocessor of FIG. 1 to control the motor.

Referring now to FIG. 2 the speed loop and current loop for controlling the DC motor implemented by microprocessor 45 of FIG. 1 are shown in block diagram form. A tachogenerator feedback signal, if available, or a counter e.m.f. signal derived from armature voltage is supplied to a lag lead network 69. The feedback signal from the lag lead network is subtracted from a speed reference signal in summer 71. The speed error signal is coupled to a speed regulator 73 having a proportional plus integral component. The proportional gain portion comprises a gain SLPG to be adjusted during speed loop tune up, divided by a scale factor (180). The integral portion contains a gain SLIG, to be adjusted during speed loop time up, multiplied by 180/(4096S) where 180/4096 is a scale factor and s is the Laplace operator.

The output of the speed regulator 73 which is a current command is coupled to a current limit block 75 and then to a current rate limit block 77. The current command compared to an armature current feedback signal in summer 79. The current error signal from summer 79 is supplied to a current regulator 81, which for continuous conduction condition in one of the SCR budges comprises a proportional plus integral current regulator. A continuous conduction condition is defined as each SCR in a bridge conducting current for 60° of the AC supply period. Gain block 83 provides the proportional gain appropriately scaled and gain block 85 provides the integral gain. During periods of discontinuous current the current regulator comprises a proportioned gain provided by block 87. Discontinuous current is defined as each SCR in a bridge conduction for less than 60° of the AC supply period. The current regulator output provides the input for the firing circuit which controls the output of the dual bridge rectifier.

In order to properly tune up the speed loop parameters in a drive, the actual inertia of the motor and load as reflected back to the motor shaft (wk²) and the desired response or cross over frequency ($\omega_c$) are required. The torque required to accelerate a drive $T_A$ (which does not include the torque required to overcome friction) is related to the actual inertia of the motor and load as shown in equation (1).

$$T_A = \frac{wk^2 \Delta N}{308 \, t_u} \quad (1)$$

where
wk² is the total system inertia as reflected to the motor shaft (lb/ft)².
$\Delta N$ is the change in motor speed (RPM)
$t_u$ is the time to accelerate (seconds)

The torque is during deceleration $T_D$ is shown in equation (2)

$$T_D = \frac{wk^2 \Delta N}{308 \, t_d} \quad (2)$$

where
td is the time to decelerate.

The total motor torque is related to horsepower (HP) and base speed $N_B$ as shown in equation (3).

$$T = \frac{5250 \, HP}{N_B} \quad (3)$$

The acceleration torque $T_A$ and the total torque are related as shown in equation (4).

$$T_A = \frac{T \, I_{ACCEL} = T}{I_{RATED}} \frac{I_{ACTUAL} - I_{LF}}{I_{RATED}} \quad (4)$$

where
$I_{ACCEL}$ is the current needed in addition to the current required to overcome friction to accelerate the motor $I_{ACTUAL}$ is the motor current supplied to the motor during motor acceleration which includes a portion to overcome motor friction and portion to accelerate the motor.
$I_{RATED}$ is the rated motor current typically provided on the motor name plate.
$I_{LF}$ is the motor current required to overcome motor friction.

The deceleration torque $T_D$ and the total torque are related as shown in equation (5).

$$T_D = T \frac{I_{LF}}{I_{RATED}} \quad (5)$$

Rearranging terms in equation (1) and substituting equations (3) in equation (1) results in equation (6)

$$wk^2 = HP \, 5250 \, (308) \frac{\frac{I_{ACTUAL} - I_{LF}}{I_{RATED}}}{N_B \, \Delta N} \quad (6)$$

Substituting equation (5) and (2) in equation (6), using $I_{LF}+10\%$ rated for the actual current supplied to the motor and using a change in motor speed of 10% of top speed (0.1$N_T$), equation (7) results.

$$wk^2 = \frac{HP \, 5250 \, (308) \, (t_u \times t_d) \, (I_{LF} + 10\% \text{ rated})}{N_B \, (0.1)N_T(t_u + t_d) \, I_{RATED}} \quad (7)$$

The value $I_{LF}+10\%$ rated current was chosen as a value large enough to overcome friction and accelerate the motor to 10% of top speed. Either 5% or 10% of rated current is added to $I_{LF}$. If $I_{LF}$ is less than 5% of rated current then a value of $I_{LF}+5\%$ rated current is used. If $I_{LF}$ is greater than 5% rated current then $I_{LF}+10\%$ rated current is used. Reducing the number of needed parameters and assuming $I_{LF}$ is in percent then $$wk_2 = \frac{HP \, 5250 \, (408) \, (t_u \times t_d) \, (I_{LF} + 10\% \text{ Rated})}{N_B \, (0.1)N_T(t_u + t_d) \, 100} \quad (8)$$

$$\text{Letting } K = \frac{wk^2 N_T}{100 \, HP} \quad (9)$$

Since motor gain parameter usually requires the factor of $wk^2/HP$.

$$K = \frac{(I_{LF} + 10\% \text{ Rated}) 5250 (308)}{10^3 N_B \left( \frac{1}{t_u} + \frac{1}{t_d} \right)} \quad (10)$$

Referring now to FIG. 3, the sequence of steps implemented by the microprocessor 51 of FIG. 1 in performing the automatic speed loop tune up are shown. The desired crossover frequency is entered by the operator using the keypad 63 of FIG. 1. In general, the greater the value of the crossover frequency $\omega_c$ the less time the system will require to reach steady state and therefor the faster the response. The top speed and base speed are usually found on the motor nameplate. The horsepower of the motor is not needed since the gains to be determine in the speed loop require inertia and horsepower in form expressed in the parameter K.

To determine inertia, the stiction current, which is the current needed to start the rotor shaft turning, and the friction current, defined as the current required to keep the motor shaft rotating are found. The motor is checked to make sure that it is stopped by detecting changes in motor speed between successive samples to determine that the motor is neither accelerating nor decelerating and below a predetermined speed. The predetermined speed is a small value used to account for speed measurement offset errors. The only information received by microprocessor 51 from microprocessor 45 in the preferred embodiment is motor speed.

The drive is placed in the current regulating mode by means of the communication link from microprocessor 51 to microprocessor 45. Motor current commands are sent from microprocessor 51 to microprocessor 45 in 1% steps every 333 msec until the motor is determined to be accelerating. The size of the current step and the step time used depends on the bandwidth of the feedback of the drive, the communication bandwidth from the drive to the tune up apparatus, and the mechanical time constant of the motor and load. The value of current commanded $I_L$ which causes motor acceleration is stored as the stiction current $I_S$.

As soon as motor acceleration is detected, zero current is commanded and the variable $I_L$ is set equal to $I_S - 1$. When the motor has been determined to have stopped accelerating the current command of $I_L$ is sent to the microprocessor 45 and if motor acceleration is again detected zero current is again commanded until acceleration stops. The current command $I_L$ is set equal to $I_L - 1$ to be applied again to check for acceleration. The current command is reduced until a current command is reached that does not cause motor acceleration. The current command is stored as the motor friction current $I_{Lf}$.

Next, the time to accelerate to 10% of the top speed $t_u$ and the time to coast to a stop $t_d$ are found. The motor is first checked to see that it is stopped. The friction current plus 10% of rated current is commanded to get the motor started and a $t_u$ timer in microprocessor 51 is started. When motor shaft rotation is detected, the current command is reduced to friction current $I_{Lf}$ plus 10% of rated current to continue motor acceleration. When a speed of 10% of top speed is detected the $t^u$ timer is stopped and the timer is stored as $t_u$. A coast stop is commanded and a $t_d$ timer is started in microprocessor 51 when the motor speed =10% top speed and is decelerating. When the motor stops, the $t_d$ timer is stopped and the timer value stored as $t_d$. The value of K shown in equation (10) can now be calculated.

Next, the desired response, as represented by the speed loop crossover frequency $\omega_c$ provided by the operator is verified as to feasibility based on the inertia determined. Assuming a slightly overdamped response characteristic is assumed and the largest value of $\omega_c$ possible $\omega_{cmax}$ is determined in equation (11).

$$\omega_{cmax} = \sqrt{\frac{(1868) 10^4}{N_T K} - 1} \quad (11)$$

If $\omega_{cmax}$ is greater than or equal to the $w_c$ entered by the operator then $w_c$ is feasible and $w_c$ is displayed on display 67 of FIG. 1 and the operator can acknowledge the acceptance of the response time by pressing a button on the keypad. If $\omega_{cmax}$ is less than the $w_c$ entered by the operator the $\omega_{cmax}$ is displayed on display 67 of FIG. 1 and the operator can acknowledge the modified response time by pressing a button on the keypad. The value of K and the selected value of $w_c$ are used to determine the following gains for 60 HZ operation:

$$SLIG \text{ (speed loop integral gain)} = \frac{N_B K \omega_c^2}{9.3 \times 10^4} \quad (12)$$

$$SLPG \text{ (speed loop proportional gain} = \frac{SLIG \, 5.6}{w_c} \quad (13)$$

The gain in equation (12) and (13) are used, in the speed loop when tach feedback is available and the drive is operating below base speed. When there is a tach feedback available and the drive is operating above base speed the gains in equations (14) and (15) are used.

$$SLIG = \frac{w_c^2 K N_B((N_T - N_B)/2)}{9.3 \times 10^4} \quad (14)$$

$$SLPG = \frac{SLIG \, 5.6}{w_c} \quad (15)$$

The gains used in the speed loop when tack feedback is not available are shown in equations (16) and (17).

$$SLIG = \frac{N_B K w_c^2}{9.3 \times 10^4} \quad (16)$$

$$SLPG = \frac{SLIG \, 5.6}{w_c} \quad (17)$$

The speed feedback lead in the lead network 69 is shown in equation (18) and is used below and above base speed and with or without tach feedback.

$$\text{Speed feedback lead} = \frac{256}{\text{Integral Loop/Sec}} \quad (18)$$

The foregoing describes a method of automatically tuning up the speed loop gains of a drive system coupled to a load to achieve an operator commanded response time.

While the invention has been particularly shown and described with reference to an embodiment thereof, it will be understood by those skilled in the art that various changes in form and details may be made therein without departing from the spirit and scope of the invention.

What is claimed is

1. A method of tuning up a speed loop in a drive system for a motor coupled to a load, said drive system having a current control loop, the method comprising the steps of:
   setting a commanded current at a minimum value sufficient to effect acceleration of the motor;
   calculating motor-load inertia from the time required to accelerate the motor to a predetermined speed in response to the commanded current;
   selecting a speed loop crossover frequency; and
   setting speed loop parameters based on the calculated motor-load inertia to achieve the selected crossover frequency thereby tuning up the speed loop.

2. A method of tuning up a speed loop in a drive system for a motor coupled to a load, said drive system having a current control loop, the method comprising the steps of:
   providing a desired response represented by a selected speed loop crossover frequency for the motor drive system;
   setting a commanded current at a minimum value sufficient to effect acceleration of the motor;
   determining motor-load inertia from the time required to accelerate the motor to a predetermined speed in response to the commanded current;
   determining if the desired response is achievable with the calculated inertia;
   calculating a maximum achievable crossover frequency based on the inertia calculated if the desired response is not achievable; and
   setting the speed loop parameters based on the achievable crossover frequency and measured inertia, thereby tuning up the speed loop.

3. A method of tuning up a speed loop in a drive system for a motor coupled to a load, said drive system ahving a current control loop, the method comprising the steps of:
   calculating motor friction current;
   calculating the time required for the motor to accelerate to a known speed when a predetermined fraction of rated motor current plus motor friction current is commanded;
   calculating the time required for the motor to decelerate from a known speed;
   calculating motor-load inertia from motor friction current and motor acceleration and deceleration time; and
   setting speed loop parameters based on motor-load inertia to achieve maximum response as represented by a maximum stable value of crossover frequency thereby tuning up the speed loop.

4. The method of claim 3 wherein said step of determining motor friction comprises the steps of:
   (a) providing motor current commands in increasing steps to the current control loop;
   (b) monitoring the motor speed to determine when motor acceleration begins;
   (c) commanding zero current when motor acceleration begins;
   (d) monitoring motor speed to determine when the motor stops accelerating;
   (e) commanding a motor current in the current control loop smaller than the current which produced motor acceleration;
   (f) monitoring motor speed to determine if the motor accelerates due to the reduced current command;
   (g) repeating steps (e) and (f) if motor acceleration is detected in step (f); and
   (h) saving the reduced commanded current that does not produce acceleration, as the motor friction current.

5. A method of tuning up a speed loop in a drive system for a motor coupled to a load, said drive system having a current control loop, the method comprising the steps of:
   (a) providing the desired response time for the motor drive system;
   (b) providing motor current commands in increasing steps to the current control loop;
   (c) monitoring the motor speed to determine when motor acceleration begins;
   (d) commanding zero current when motor acceleration begins;
   (e) monitoring motor speed to determine when the motor stops accelerating;
   (f) commanding a motor current in the current control loop smaller than the current which produced motor acceleration;
   (g) monitoring motor speed to determine if the motor accelerates due to the reduced current command;
   (h) repeating steps (f) and (g) if motor acceleration is detected in step (g);
   (i) saving the reduced commanded current that does not produce acceleration, as the motor friction current;
   (j) stopping the motor;
   (k) providing a current command to the current control loop to accelerate the motor;
   (l) calculating the time it takes the motor to achieve a predetermined fraction ofmotor top speed;
   (m) measuring the time it takes motor speed to coast to a stop;
   (n) calculating motor-load inertia dependent on motor friction current, time to accelerate to a known speed and coast to a stop from a known speed;
   (o) calculating whether if the desired response time is achievable with the inertia measured;
   (p) calculating maximum achievable response time based on inertia determined if the desired response time is not achievable; and
   (q) setting speed loop parameters based on achievable response time and measured inertia, thereby tuning up the speed loop.

* * * * *